Aug. 9, 1966     E. K. HOWELL     3,265,877
ILLUMINATING SYSTEM
Original Filed Dec. 19, 1961
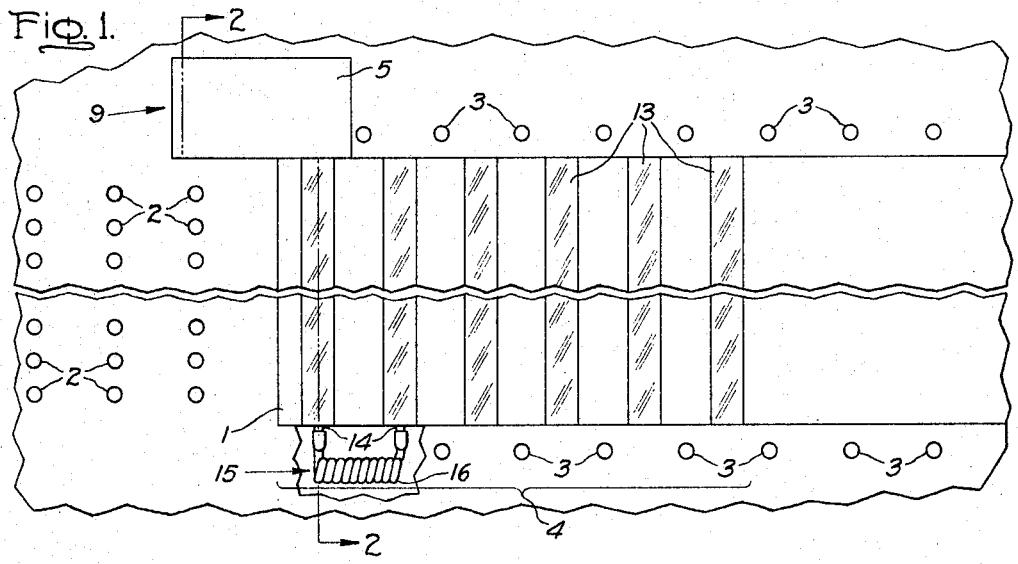
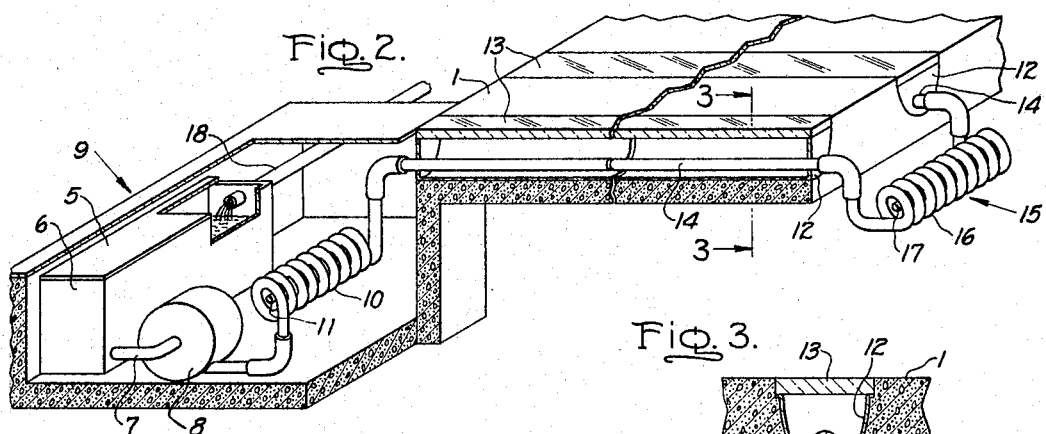
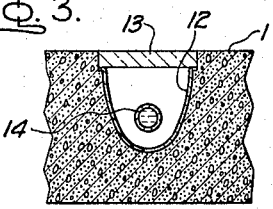
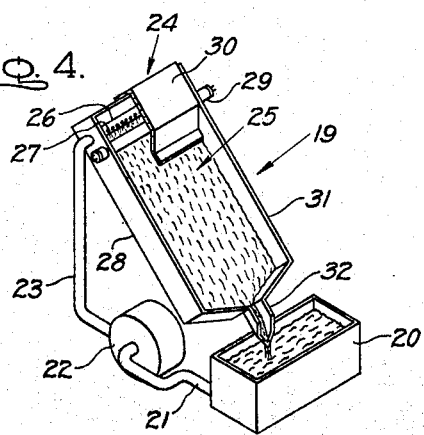
Inventor:
Edward Keith Howell
by Henry T. Olsen
His Attorney

United States Patent Office

3,265,877
Patented August 9, 1966

1

3,265,877
ILLUMINATING SYSTEM
Edward Keith Howell, Skaneateles, N.Y., assignor to General Electric Company, a corporation of New York
Continuation of application Ser. No. 160,485, Dec. 19, 1961. This application July 26, 1965, Ser. No. 477,641
4 Claims. (Cl. 240—1.2)

This application is a continuation of application Serial No. 160,485, filed December 19, 1961, assigned to the same assignee as the present application, and now abandoned.

This invention relates to the field of illumination and more particularly to a method and system for illuminating the touch-down portion of an airport runway, or the like, which utilizes the phosphorescent property of luminescent material.

At present the methods for providing illumination are rather limited in that the energy conversion necessary to produce the light must take place immediately at the point of utilization. For example, if light is to be produced by gas, the gas must be piped to the place where illumination is required and then burned immediately at this point; similarly, if electrical energy is to be converted by means of incandescent filaments or arc discharges, the electrical energy must be converted to light by such means immediately at the place desired to be illuminated. In many cases the presence of these energies at the location to be lighted is undesirable and hazardous. It is therefore an object of this invention to provide a method and system for illumination in which the dangerous energies are applied at a point remote from the area to be lighted.

Luminescent materials, that is, material which emits light upon excitation, have been shown to exhibit two types of emissions. The one type of emission which is contemporaneous with the excitation energy is termed fluorescence and the other type which occurs for some time after removal of the excitation energy is termed phosphorescence. This invention relates to the use of the latter type of emission, so it is intended that the term phosphorescent material, as used herein below, refers to such luminescent material as exhibits a lengthy after-glow emission rather than such as reqires continuous excitation. It is therefore a further object of this invention to provide a new method and system for utilizing phosphorescent material.

The phosphors of sulfides activated with various materials generally exhibit long-persisting decay characteristics and are truly phosphorescent. A further object of this invention is to provide a new method and system utilizing sulfide phosphors.

The phosphor used is to be excited by an energy source. The energy of excitation will depend on the particular phosphor used, some phosphors being more susceptible to particular wave lengths of energy than others; thus, the energy may be heat, visible light, ultra-violet light or radio-active energy. In any case, the phosphor must be held at a point where the energy is to be applied for a sufficient period of time to activate the phosphor. It is a further object to provide a new method and system for utilizing phosphorescent material which includes an exciting source for the phosphorescent material.

One important application for a system in accordance with this invention is in airport runway lighting. Present runway lighting consists of "approach lights" which clearly define a line extending from the end of the runway for several thousand feet and "runway lights" which outline the edges of the runway itself. The surface of the runway is not illuminated, however, and pilots often lose the feeling of height which is essential to a good landing. Pilots have described this sensation as trying to land in a "black hole." In order to provide good reference lighting for the pilot, it has been suggested that the touch-down area of the

2 runway itself be lighted. Such a suggestion, while easily made, is not easily solved. It is obvious that light produced by the burning of gas cannot be used, due to the fumes from the airplanes which are themselves combustible if placed in the presence of an open flame, such as produced in the gas light. To adequately illuminate the touch-down area of the runway, it is necessary that such lighting be embedded in the runway itself. Since electric lamps require periodic replacement, the cost of an installation which would permit such replacement and be strong enough to withstand the weight of the airplanes landing immediately on the embedded fixture would be prohibitive. It is therefore another object of this invention to provide a method and apparatus for illuminating the touch-down area of an airport runway which requires no dangerous energies to be brought immediately to the runway. A further object is to provide a system wherein the maintenance required to sustain the system may be performed outside of the area of the runway proper and requires no tampering with the installation in the surface of the runway at any time.

Another application of this invention is for display purposes. For example, artificial waterfalls, fountains and the like. It is therefore another object of this invention to provide a method and apparatus for illuminating which is adaptable for many novel display purposes.

In accordance with the above-mentioned objects, applicant's method of illuminating an area comprises the steps of providing a fluid suspension of a phosphorescent material, holding the fluid suspension at an exciting station for a period of time sufficient for the phosphor to absorb energy, and then moving said suspension through the area to be illuminated.

In accordance with the above objects of the invention, the system comprises a reservoir containing a liquid suspension of phosphorescent material, means for exciting said phosphorescent material and means for moving said suspension from the reservoir through the area to be illuminated.

In the drawing, FIGURE 1 is a plan view of a portion of an airport runway with an illuminating system installed in accordance with the invention;

FIGURE 2 is a perspective view, partly sectionalized, of the installation shown in FIGURE 1;

FIGURE 3 is a sectional view taken along the lines 3—3 of FIGURE 2 in the direction indicated by the arrows; and FIGURE 4 is a perspective view of an artificial waterfall constructed in accordance with the invention.

In FIGURE 1 the airport runway 1 is equipped with approach lights 2 and runway lights 3 as is conventional. In addition, the touch-down area 4 is illuminated in accordance with this invention.

The main component of the touch-down area illuminating system is contained in a vault 5 which, as shown, is buried beneath the ground but which, of course, could be placed above ground if desired. The vault 5 contains a reservoir 6 filled with an aqueous suspension of phosphorescent material such as zinc sulfide. A conduit 7 leads from the bottom of reservoir 6 to a centrifugal pump 8. The discharge from the pump 8 goes to an exciting station 9 and is discharged from the vault through tube 14. The exciting station 9 consists of a helical coil of transparent tubing 10 surrounding a source of energy 11 for exciting the zinc sulfide material. As shown, the source of energy 11 is a fluorescent lamp having an ultra-violet emitting phosphor coating inside it. In the touch-down area of the runway, a reflector 12 is secured. This reflector is upwardly concave and closed at its top to form a passageway by a plate 13 secured in the concrete of the runway 1. The plate 13 is transparent and, for example, may be of a heavy plate glass. Located within the passageway as best shown in FIGURE 3 is a transparent tube 14 for carrying the excited phosphorescent material from tubing 10.

On the opposite side of the runway from vault 5 there may be provided an auxiliary exciting station 15 receiving material from tube 14. The exciting station 15 is similar in construction to that of exciting station 9 in that it comprises a helical transparent tube 16 and a source of energy 17 such as a fluorescent lamp. From exciting station 15, the phosphorescent material is passed through the next adjacent tube 14 located in the touch-down area of the runway. Auxiliary exciting stations similar to 15 are located on alternate sides of the runway and a series of tubes 14 are provided to illuminate the interior touch-down area. A return tube 18 is provided to carry the liquid suspension from the final tube 14 back to reservoir 6. The reservoir 6 is preferably located and is of sufficient capacity so that the liquid suspension of phosphor is stored in the reservoir during daylight hours to eliminate the solar degradation of the phosphor which would be normally encountered in outdoor applications.

As shown in FIGURE 4, the invention may be utilized to create an artificial luminous cascade or waterfall 19. A reservoir 20 for a liquid suspension of phosphorescent material is provided with an outlet pipe 21 connected to a centrifugal pump 22, which directs the suspension through a conduit 23 to an exciting station 24 and an area to be illuminated 25. The exciting station 24 includes a discharge tube 26 having a plurality of perforations 27 which distributes the suspension uniformly throughout an exciting plate 28; a source of energy 29, such as a fluorescent lamp, and an enclosure 30. From the exciting plate 28, the suspension flows through the area 25 down a chute 31, whereon the phosphorescent material radiates the stored energy, and provides the effect of a lighted waterfall. While the chute 31 is shown as flat, it may be made rippled or contoured to give additional effects. The suspension may be provided with phosphors irradiating various colors to give a multi-colored effect. At the bottom of chute 31, the suspension is collected and returned to the reservoir 20 by a funnel-shaped member 32.

The phosphor used in the above applications may be used in the ordinary granular form, or in other forms. In the case of some phosphors which are deteriorated rapidly in the liquid suspension, the granules may be encapsulated in a water-impervious plastic to protect them. The granules may be mounted on particles of a polystyrene foam so as to make light particles capable of being distributed in an air suspension to illuminate an area.

The exciting source may be of various types. For example, the ultra-violet emitting lamp may be replaced with an infra-red heat lamp or an open flame. A further source of energy contemplated is a small mass of radioactive material.

Although preferred embodiments of the invention have been disclosed, it will be understood that the invention is not to be limited to the particular arrangement of steps or parts shown and that they may be widely modified within the spirit and scope of the invention as defined by the appended claims.

What I claim as new and desire to secure by Letters Patent of the United States is:

1. An illuminating system comprising, in combination, a reservoir of a liquid suspension of phosphorescent material which exhibits a lengthy after-glow emission, conduit means leading from said reservoir to an area to be illuminated and returning to said reservoir, said conduit means being transparent in the region of said area and in a portion entirely remote from said area, excitation means arranged adjacent said remote transparent portion of said conduit means for exciting the liquid suspension to render it luminous, and pump means for moving said phosphorescent liquid suspension through said conduit means, whereby the liquid suspension rendered luminous by said excitation means at said remote transparent portion illuminates the area to be lighted when passing through the transparent conduit portion in the region of said area.

2. An illuminating system as defined in claim 1, wherein said remote transparent portion of said conduit means is in the form of a helix of transparent tubing connected to the outlet of said pump, and said excitation means is located within the helix of tubing.

3. A system as defined in claim 1 for illuminating the touch-down area of an airport runway, further including a reflector embedded in the runway, and a transparent cover for said reflector, said conduit means having a transparent tube located within the enclosure defined by said transparent cover and said reflector.

4. An illuminating system as defined in claim 1, wherein said liquid suspension of phosphorescent material comprises an aqueous suspension of zinc sulfide phosphor.

References Cited by the Examiner

UNITED STATES PATENTS

| | | | |
|---|---|---|---|
| 1,724,572 | 8/1929 | Geisen | 88—24 |
| 1,979,336 | 11/1934 | Martin et al. | 40—106.21 |
| 2,038,506 | 4/1936 | Cadieux | 240—1.2 |
| 2,392,828 | 1/1946 | Noel | 240—11.4 |
| 2,546,239 | 3/1951 | Rothchild. | |
| 3,058,245 | 10/1962 | Pieters | 40—106.21 |

NORTON ANSHER, *Primary Examiner.*